United States Patent [19]
Eignor et al.

[11] Patent Number: 6,065,756
[45] Date of Patent: May 23, 2000

[54] FLEX SEAL FOR GAS TURBINE EXPANSION JOINTS

[75] Inventors: James Giles Eignor, Scotia; Nicholas Philip Poccia, Gansevoort; Leroy Omar Tomlinson, Schenectady, all of N.Y.

[73] Assignee: General Electric Co., Schenectady, N.Y.

[21] Appl. No.: 08/988,013

[22] Filed: Dec. 10, 1997

[51] Int. Cl.⁷ ........................................... F16J 15/02
[52] U.S. Cl. .................. 277/545; 277/555; 277/576; 277/903; 285/13; 285/223; 285/187; 285/917
[58] Field of Search ..................... 285/223, 224, 285/225, 13, 187, 917; 415/134, 135, 136, 168.1; 277/543, 637, 903, 550, 551, 576, 572, 939, 545, 555

[56] References Cited

U.S. PATENT DOCUMENTS

| | | | |
|---|---|---|---|
| 3,721,460 | 3/1973 | Holman et al. | 60/39.32 |
| 3,960,381 | 6/1976 | Piotrowski | 277/576 X |
| 4,318,668 | 3/1982 | Chaplin et al. | 415/135 |
| 4,433,848 | 2/1984 | Williams | 277/547 X |
| 4,791,980 | 12/1988 | Gagar | 277/903 X |
| 4,961,588 | 10/1990 | Brienza | 277/903 X |
| 5,462,290 | 10/1995 | Alday | 277/903 X |
| 5,474,306 | 12/1995 | Bagepalli et al. | |
| 5,657,998 | 8/1997 | Dinc et al. | |
| 5,876,042 | 3/1999 | Graf et al. | |

*Primary Examiner*—Dave W. Arola
*Attorney, Agent, or Firm*—Nixon & Vanderhye

[57] ABSTRACT

An expansion joint seal between a gas turbine exhaust duct and an axially adjacent exhaust ductwork comprising plural layers of axially adjacent layers of flexible seal plates, each layer comprising a plurality of arcuate segments which together form a 360° annulus; and further wherein the plural layers of flexible seal plates are secured at one end to the gas turbine exhaust duct, with opposite ends of the seal plates slidably engaged with at least one surface of the exhaust ductwork.

10 Claims, 7 Drawing Sheets

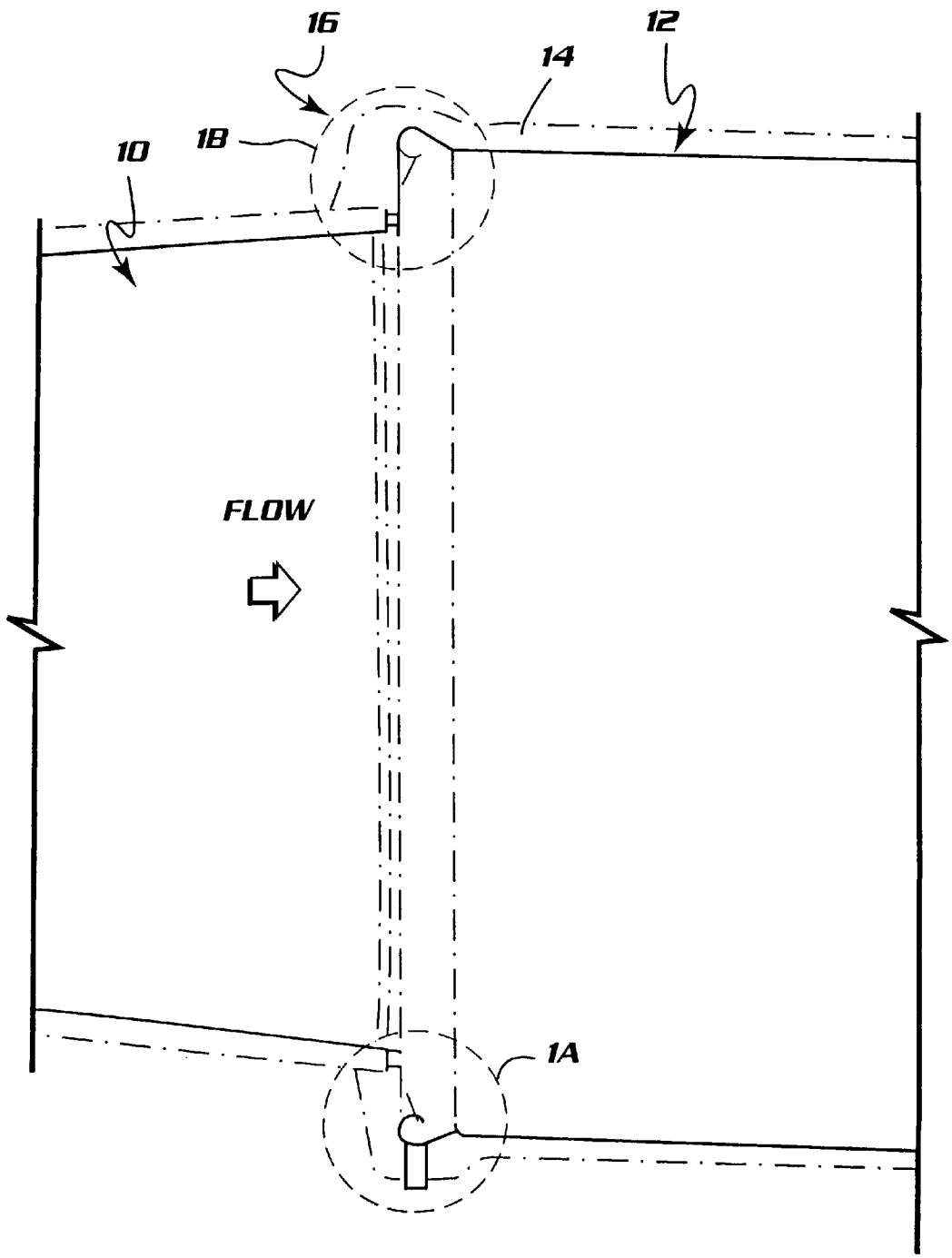

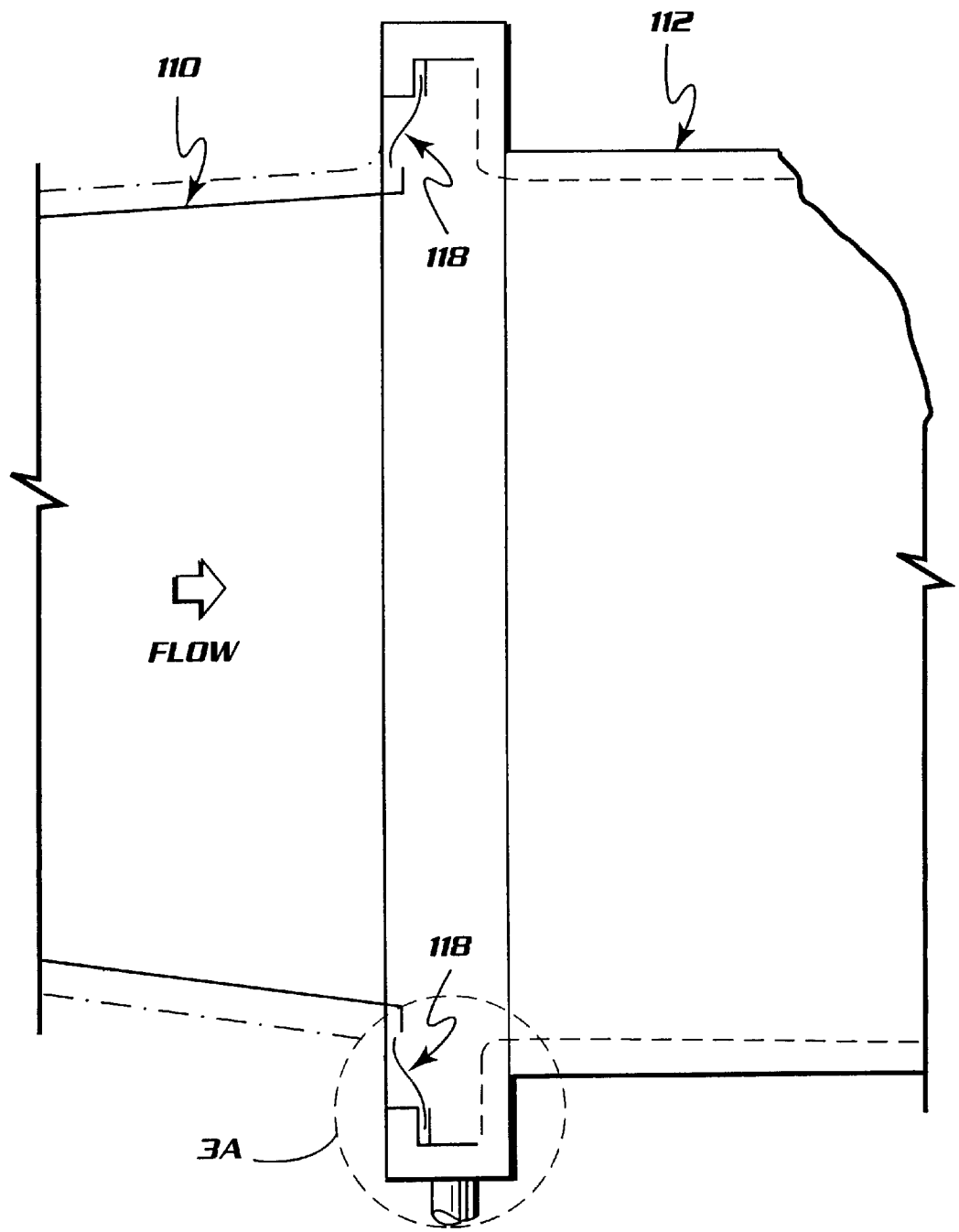

FLEX SEAL FOR GAS TURBINE EXPANSION JOINTS

TECHNICAL FIELD

This invention relates generally to gas turbines and specifically to flex seal arrangement for expansion joints in gas turbine exhaust systems.

BACKGROUND

Current expansion joints in gas turbine exhaust systems with hot flanges are generally designed in one of two ways. The most common design is a flat belt arrangement consisting of a ceramic fiber composite belt and bolster bag. One end of the belt is bolted to a frame attached to the gas turbine and the other end is bolted to a frame on the adjacent exhaust ductwork. The gas seal in the composite belt is provided by a Teflon™ layer, metal foil or metal impregnated cloth. The other most common design, sometimes called a "D" style due to the cross-sectional shape of the belt, is a composite belt and bolster with one end bolted to a bar mounted on the gas turbine flange and the other end bolted to a flange on the exhaust ductwork. The belt acts as a diaphragm.

The first mentioned flat belt arrangement has experienced problems including cracked frames due to thermal transients; burned belts due to frames cracking and bolster bag failure; and leakage during gas turbine water wash cycles which not only allows contaminated water to leak onto the ground, but also damages the ceramic fibers in the belt and bolster bag. Liquid fuel ingestion in the event of a failure to fire on liquid fuel-fired gas turbines damages fibers and binders and burns when gas turbine exhaust temperature increases. Moreover, while this design handles large relative motions (3 or more inches axially), the ceramic fiber, once stretched, does not return to its original shape, thereby resulting in burning and hot gas leaks.

The second mentioned "D" style composite belt and bolster bag arrangement has also proven less than satisfactory in that it is very difficult to install this style belt on the ductwork, and because, over time, the bolster bag will degrade and allow hot gas to damage the belt, possibly also resulting in failure.

A metal bellows arrangement has also been used in similar applications, but requires two bellows separated by several feet to accommodate lateral offset as well as relative axial movement. In some cases, the metal bellows concept requires high quality field welding. Overall, the metal bellows technique for large gas turbines have been susceptible to cracking due to thermal fatigue and is thus also unsatisfactory.

DISCLOSURE OF THE INVENTION

The present invention addresses the problem of flexibly connecting either a hot or cold turbine flange to either a hot or cold exhaust ductwork flange within the context of gas turbine axial flow exhaust systems with substantially round cross-sectional shapes. The present invention also addresses the problem of disposing of water or liquid fuel in a manner which prevents contaminated water from leaking onto the ground.

In one exemplary embodiment of the invention, the relative axial and radial motion of a hot gas turbine duct relative to a cold exhaust ductwork is accommodated by layers of overlapping thin metal plates, with first ends of the plates bolted to a flange mounted on the gas turbine duct, and the other ends of the plates either guided or axially supported by the adjacent exhaust ductwork. The thickness and the arc length of the plates are designed to allow the plates to create a gas seal during all gas turbine operating modes. In this embodiment, the free ends of the plates flexibly engage, and are free to slide on, an annular edge of a drainage trough supported on the exhaust ductwork. In addition, the inherent geometry of this design allows the trough to be integrated into the exhaust ductwork and thereby allow easy removal of water and liquid fuel, as described in further detail herein.

In a second embodiment, the overlapping thin metal plates are adapted for use in a hot-to-hot flange arrangement. In this embodiment, the free edges of the flexible plates are guided for radial and lateral movement between flanges supported by the exhaust ductwork.

Insulation blankets may also be employed in conjunction with the seal plates but which do not inhibit movement of the plates either axially, laterally or radially as required.

Accordingly, in its broader aspects, the present invention relates to a flex seal for an expansion joint between a gas turbine exhaust duct and an axially adjacent exhaust ductwork comprising plural axially adjacent layers of flexible seal plates, each layer comprising a plurality of the seal plates each having an arc length such that the seal plates together form a 360° annulus in each layer; and further wherein the plural layers of flexible seal plates are secured at first ends to the gas turbine exhaust duct, with opposite second ends of the seal plates slidably engaged with at least one surface of the exhaust ductwork.

In another aspect, the invention relates to a flex seal for an expansion joint in a gas turbine exhaust system, the joint including a gas turbine duct and an adjacent exhaust ductwork, the flex seal comprising plural axially adjacent layers of annularly arranged flexible seal plates secured at first ends to an annular mounting flange on the gas turbine duct, with second free ends of the flexible seal plates slidably engaged with the exhaust ductwork to thereby accommodate relative axial, lateral and radial movement between the gas turbine duct and the exhaust ductwork.

Other objects and advantages of the subject invention will become apparent from the detailed description which follows.

BRIEF DESCRIPTION OF THE DRAWINGS

FIG. 1 is a partial side elevation showing an expansion joint seal between a gas turbine duct and an adjacent exhaust ductwork in accordance with a first exemplary embodiment of the invention;

FIG. 3 is a partial side elevation illustrating an expansion joint between a gas turbine duct and adjacent exhaust ductwork in accordance with a second exemplary embodiment of the invention;

BEST MODE FOR CARRYING OUT THE INVENTION

Figure 1A:
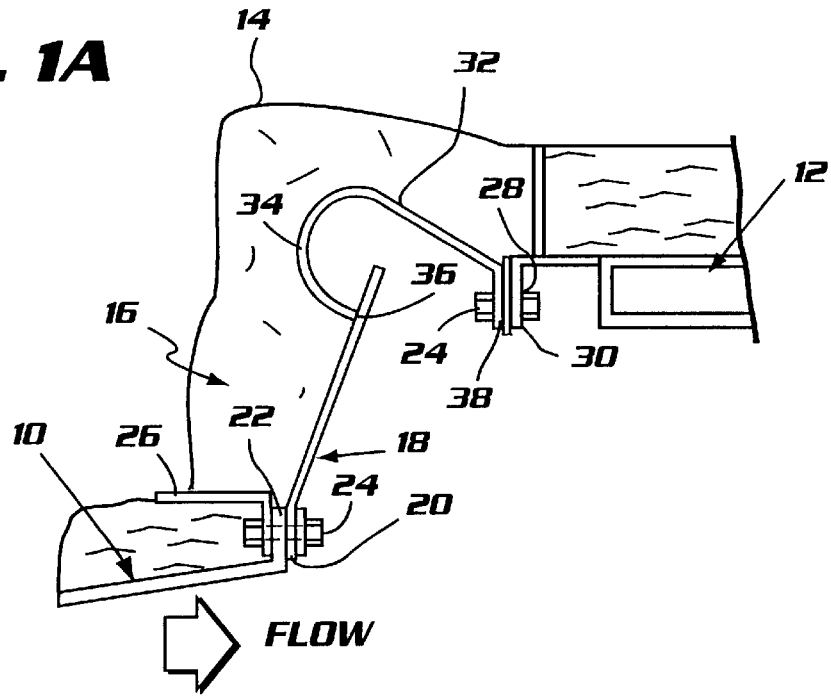
FIGS. 1A and 1B are enlarged details taken from FIG. 1.
Figure 1B:
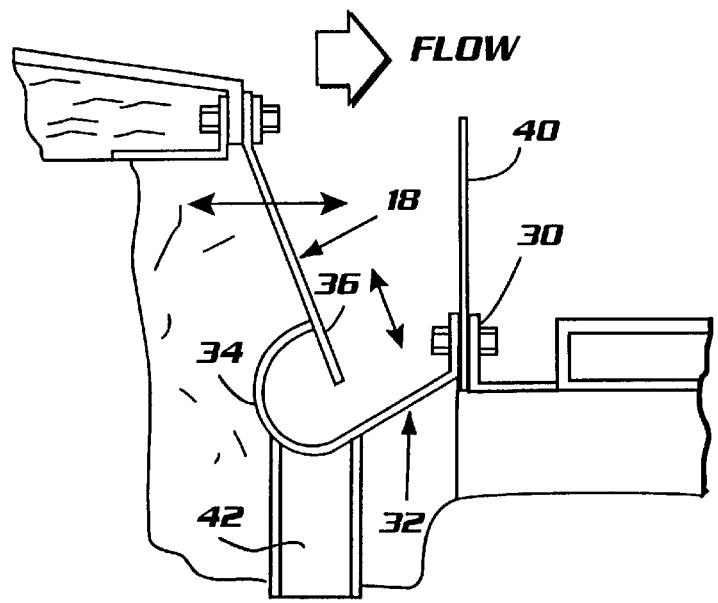

Referring to FIGS. 1, 1A and 1B, a first exemplary embodiment of this invention is illustrated, and includes a flex seal for an expansion joint between two turbine exhaust ducts 10 and 12. As shown in FIG. 1, duct 10 is a gas turbine duct, while duct 12 is an adjacent exhaust ductwork extending away from the turbine. The area about the expansion joint between the ducts 10 and 12 may be covered by external thermal insulation blankets 14 (shown in phantom), consistent with conventional practice.

Figure 2:
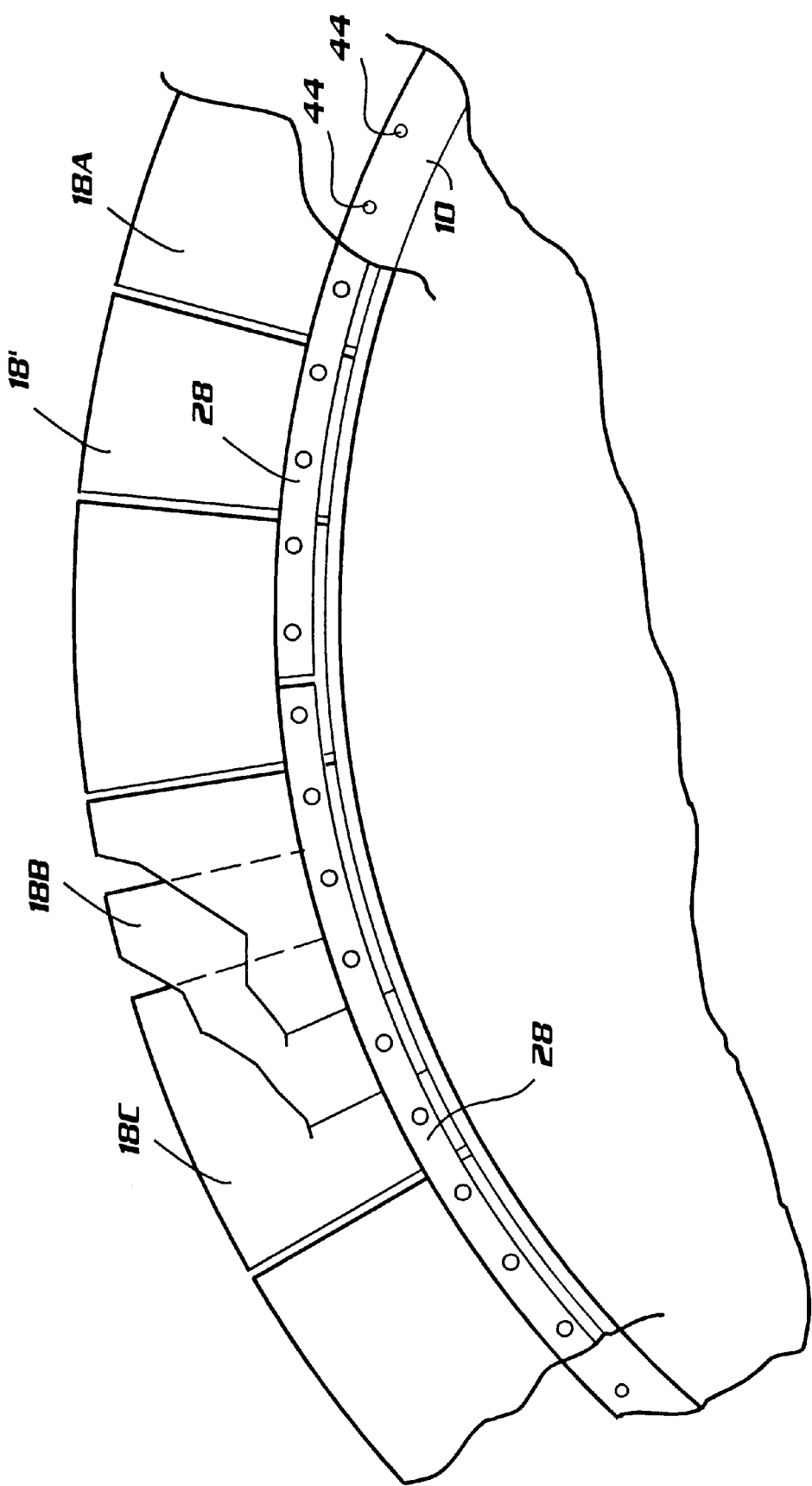
FIG. 2 is a partial end view of the flexible seal plates oriented as shown generally in FIG. 1A.
Figure 2A:
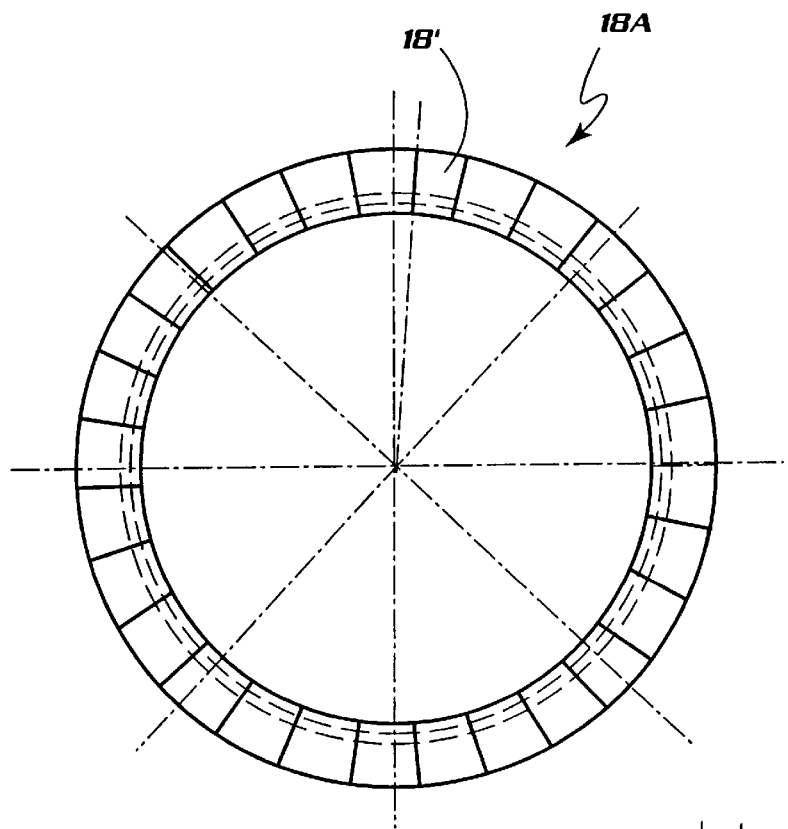
FIGS. 2A–2C are end views of adjacent layers of flexible seal plates in accordance with the invention.
Figure 2B:
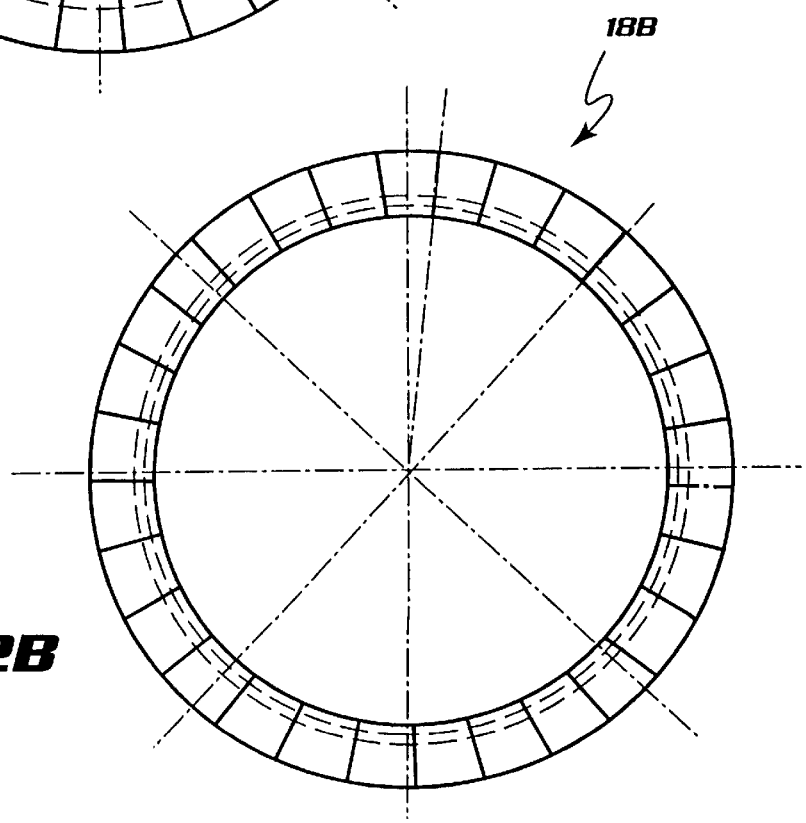
Figure 2D:
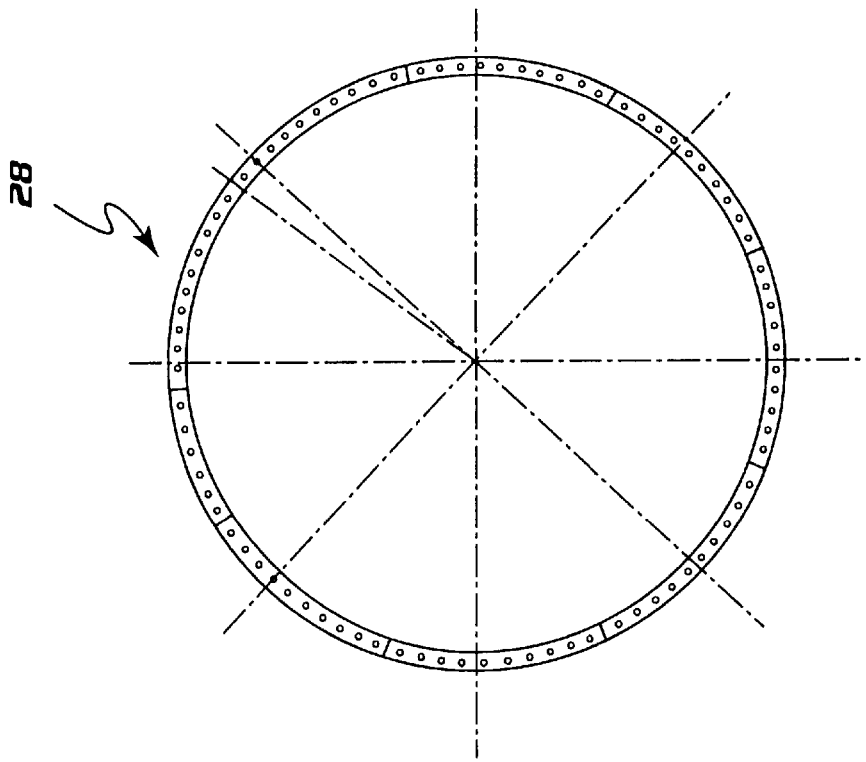
FIG. 2D is an end view of a circumferentially segmented holding bar used to secure the flexible seal plates to the gas turbine in accordance with the invention.
Figure 2C:
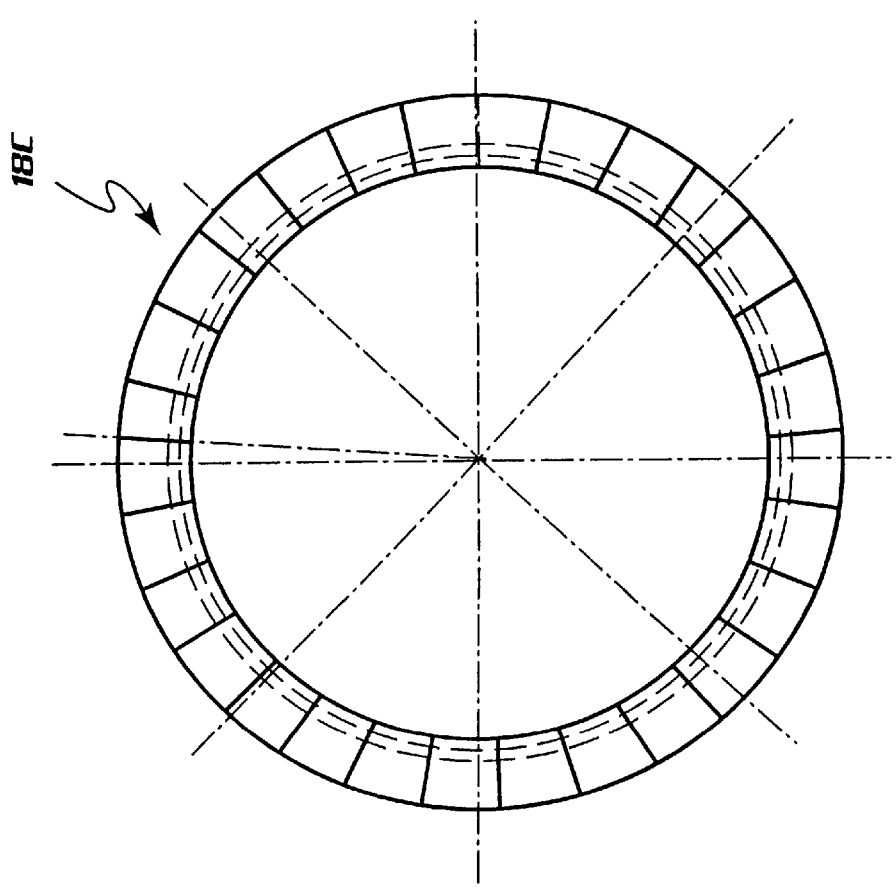

With reference now specifically to FIGS. 1A and 1B, the flex seal for this hot-to-hot flange application is shown generally at 16 and includes overlapping layers of a plurality of relatively thin flexible plates, shown generally at 18. Plate 18 is, in reality, three axially aligned layers of plates 18A, 18B and 18C (see FIG. 2). Each layer includes a plurality of such plates in a circumferential array, each plate in a given layer consisting of an arcuate segment in edge-abutting relationship with a circumferentially adjacent segment as best seen in FIG. 2 and as described in further detail below. Each arcuate plate 18 has a mounting flange 20 which is adapted to engage a flange 22 formed on the forward edge of the turbine duct 10, the seal plates 18 being secured to the flange 22 by means of screw fasteners 24 (nut bolt and washer assemblies or similar). One or more insulation retaining flanges 26 may be secured to the opposite side of the flange 22 if desired. A plurality of hold down segments 28 serve to clamp the flanges 20 to the turbine flange 22; segments 28 combining to form a 360° ring as best seen in FIGS. 2 and 2D. The flex seal plates 18 are bent toward the exhaust ductwork 12 to engage the latter in spring biased fashion as described below.

The exhaust ductwork 12 is formed at its rearwardmost end with a radial mounting flange 30 to which an annular trough bracket 32 is secured. The latter extends toward the turbine duct 10 and then terminates at a 180° turn 34 so that the free edge 36 of the trough bracket is engaged by the flex seal plates 18 as best seen in FIGS. 1A and 1B. The trough bracket 32 is formed with a radial flange 38 which, in combination with the flange 30 of the ductwork 12, sandwich an annular, radially arranged trough plate 40 which cooperates with the trough bracket 32 to define an annular drainage trough which captures any water or fuel running along the inside of the turbine duct 10. At the lowermost point of the trough bracket 32, there is a drain pipe 42 which channels any collected water and/or liquid fuel to an appropriate location.

As viewed in FIGS. 1A and 1B, it will be apparent that the flex seal plates 18 engage with the free edge 36 of the trough bracket 32 in such a way that any relative axial or radial movement between the ducts 10 and 12 will be accommodated, noting that the flex plates 18 are spring biased into engagement with the edge 36 to maintain contact therewith under all operating conditions.

As already mentioned above, the flex seal plates 18 are arranged in multiple overlapping layers about the circumference of the duct joint. The thickness and the arc length of the plates 18 have been designed to allow the plates to create a gas seal during all gas turbine operating modes. This configuration creates a compact metal "diaphragm" capable of relatively large axial and radial movements, and which results in an efficient use of space.

The layered arrangement of plates 18 is best seen in FIG. 2. Specifically, the plates 18 are secured to the turbine duct flange 22 with a first layer of Inconel™ plates 18A having an approximate thickness of 0.040 inch. This first layer includes in the exemplary embodiment, 28 three hole plates, and one two hole plate 18'. In other words, and as explained in further detail below, the circumferential extent of each plate is determined at least in part by the number of holes in the plate which mate with equally spaced holes in the turbine duct flange 22.

A second layer of Inconel™ plates 18B of approximately 0.020 inch thickness also includes 28 three hole plates and one two hole plate, but with the plates of this second layer shifted circumferentially so that there is an overlap between the first and second layers at the radial seams of the plates in the respective layers. A third layer of Inconel™ plates 18C of approximately 0.040 inch thickness also includes 28 three hole plates and one two hole plate, and this third layer is substantially circumferentially aligned with the first layer so that, again, there is an overlap between the radial seams between the second and third layers. The first and third layers need not be exactly aligned, however; they may be offset, for example, by one mounting hole. A fourth layer consists of the hold down bar assembly 28, the latter having a configuration similar to the turbine duct radial flange so that the three layers of flex plates are sandwiched between the hold down bar 28 and the turbine duct flange 22. The hold down bar is also provided in the form of circumferential segments, including in the exemplary embodiment eight 10 hole bars and one 6 hole bar. Each hold down bar segment preferably has an arc length at least about three times the arc length of the individual plates 18. Tabs may be welded to one end of each segment to cover the seams between the segments.

It will be appreciated that the number and spacing of the mounting holes 44 on the turbine duct flange 10 will determine the arc length and number of plates 18 (and hold down segments) for each layer. If, for example, the number of holes is divisible by three (for example, seventy-five holes), then twenty-five three-hole plates with identical arc lengths may be employed. In the illustrated embodiment, however, there are eighty-six holes in the turbine duct and exhaust ductwork flanges, thus requiring one plate to have two rather than three holes, as well as a smaller arc length than the remaining plates in the layer.

Figure 3A:
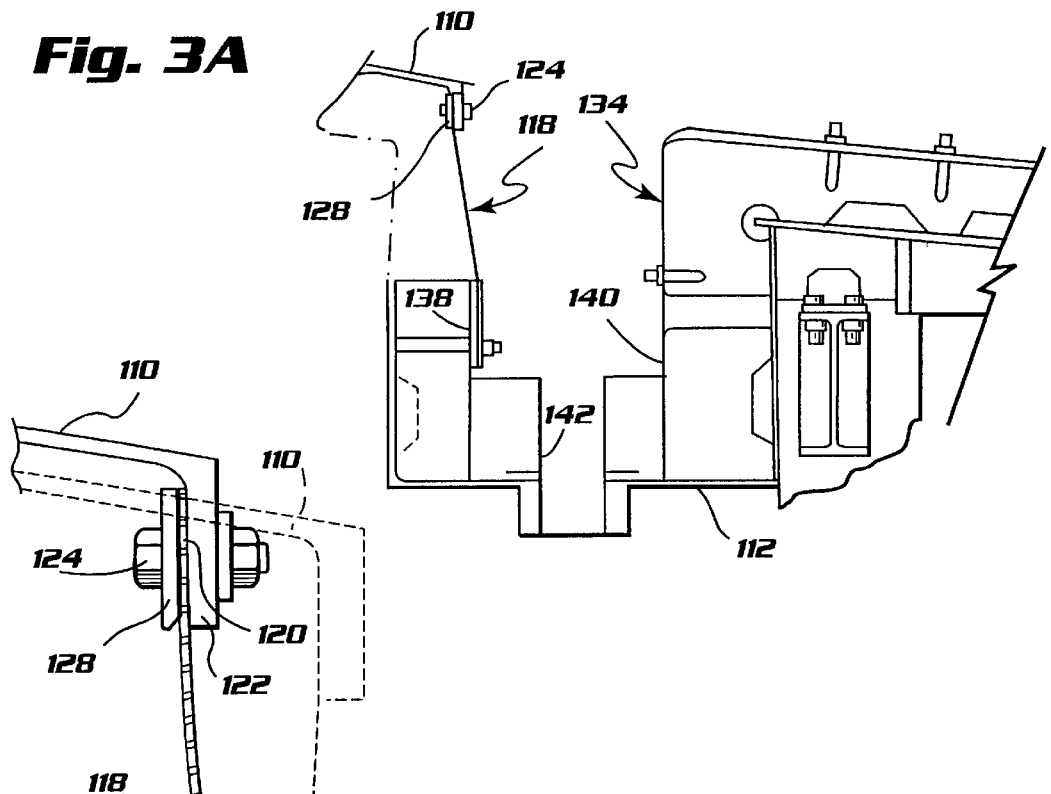
FIG. 3A is an enlarged detail taken from FIG. 3.
Figure 4:
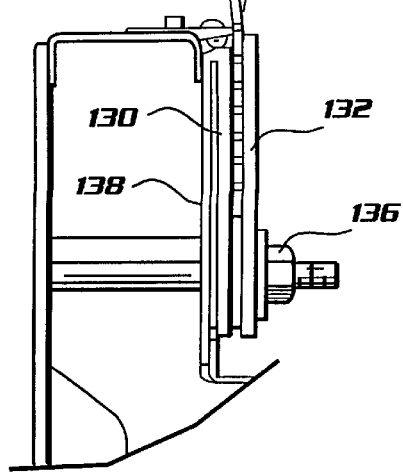
FIG. 4 is a further enlargement of FIG. 3A and illustrates the flexible seal plates in both expanded and retracted positions.

Turning now to FIGS. 3, 3A and 4, a second embodiment of the invention is illustrated which is particularly applicable to hot-cold flange applications. In this arrangement, flex plates 118 (arranged in layers as previously described) are mounted to a radial flange on the turbine duct 110 and extend radially outwardly to engage guiding means provided on the exhaust ductwork 112. More specifically, the radially outer ends 120 of plates 118 are mounted on radial flanges 122 of the gas turbine duct 110 by means of fasteners 124 and a hold down bar assembly 128 similar to the mounting arrangement described in connection with the embodiment illustrated in FIGS. 1 and 2. At the same time, the radially inner free ends of the flex plates 118 are also permitted to move radially in both inward and outward directions, guided by radially extending flanges. Specifically, the ends of the plates 118 are located between axially spaced flanges 130 and 132 which establish a radial slot in which the flex seal plates are free to move, but in a guided radial fashion. Flanges 130 and 132 are secured to a portion of a drainage trough 134 by means of fasteners 136. As a result, and with specific reference to FIG. 4, the flex plates 118 can accommodate both axial as well as radial movement, noting that the plates 118 are in the leftmost position shown in FIG. 4 when cold, and in the rightmost position when hot. This axial motion is accompanied by radial movement as well, accommodated by the sliding relationship between the flanges 130 and 132 and the free ends of the plates 118.

In this second embodiment, the drainage trough 134 is formed by axially spaced, annular walls 138, 140 as well as by the plates 118 themselves, thus catching any water and/or fuel running along the inside of the turbine duct 10. A drainage pipe 142 is also provided, similar to pipe 42. Insulation blankets may be included in the spaces between the walls of the exhaust ductwork, including the area surrounding the drainage pipe 142.

The invention as described herein offers reliable, long term performance. In this regard, the life of the metal seal plates can be easily calculated using classical handbook calculation methods. In addition, the seal in accordance with this invention accommodates more relative motion between adjacent ducts than prior techniques, i.e., up to 3 or more inches of travel.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A flex seal for an expansion joint between a gas turbine exhaust duct and an axially adjacent exhaust ductwork comprising plural axially adjacent layers of flexible seal plates, each layer comprising a plurality of said seal plates each having an arc length such that said seal plates together form a 360° annulus in each layer; and further wherein said plural layers of flexible seal plates are secured at first ends to the gas turbine exhaust duct, with opposite second ends of said seal plates slidably engaged across a free edge of said exhaust ductwork.

2. The expansion joint seal of claim 1 wherein said free edge of said exhaust ductwork comprises a free edge of an annular drainage trough adapted to capture water or fuel running along and within said gas turbine exhaust duct.

3. The expansion joint seal of claim 2 wherein said drainage trough comprises an annular, partially toroid-shaped member having a drainage pipe in a lower portion thereof.

4. The expansion joint seal of claim 1 wherein said plural layers comprise three layers.

5. The expansion joint of claim 1 wherein the flexible seal plates of each layer are circumferentially offset from the flexible seal plates of an adjacent layer.

6. The expansion joint of claim 1 including a hold down bar assembly including a plurality of hold down bar segments clamping said flexible seal plates against a radial flange on said gas turbine exhaust duct.

7. The expansion joint of claim 6 wherein said at least one surface of said exhaust ductwork comprises an edge of an annular draining trough adapted to capture water or fuel running along and within said gas turbine exhaust duct.

8. The expansion joint of claim 1 wherein said turbine exhaust duct and said exhaust ductwork are substantially round in cross section, and wherein said turbine exhaust duct has a diameter less than said exhaust ductwork.

9. A flex seal for an expansion joint between a gas turbine exhaust duct and an axially adjacent exhaust ductwork comprising plural axially adjacent layers of flexible seal plates, each layer comprising a plurality of said seal plates each having an arc length such that said seal plates together form a 360° annulus in each layer; and further wherein said plural layers of flexible seal plates are secured at first ends to the gas turbine exhaust duct, with opposite second ends of said seal plates slidably engaged with at least one surface of said exhaust ductwork, and further wherein said at least one surface of said exhaust ductwork comprises a plurality of axially spaced, circumferentially arranged flanges defining an annular radial groove therebetween in which said opposite ends of said seal plates are slidably received.

10. A flex seal for an expansion joint in a gas turbine exhaust system, the joint including a gas turbine duct and an adjacent exhaust ductwork, the flex seal comprising plural axially adjacent layers of annularly arranged flexible seal plates secured at first ends to an annular mounting flange on the gas turbine duct, with second free ends of the flexible seal plates slidably engaged within an annular radial groove in said exhaust ductwork to thereby accommodate relative axial and radial movement between said gas turbine duct and said exhaust ductwork.

* * * * *